United States Patent
Jones

(10) Patent No.: US 6,824,099 B1
(45) Date of Patent: Nov. 30, 2004

(54) BRAKE SYSTEMS FOR AIRCRAFT WING FLAPS AND OTHER CONTROL SURFACES

(75) Inventor: Kelly Jones, Snohomish, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/618,359

(22) Filed: Jul. 10, 2003

(51) Int. Cl.⁷ .............................................. B84C 13/16
(52) U.S. Cl. .................................. 244/75 R; 244/203
(58) Field of Search ............................. 244/213, 203, 244/214, 215, 216, 75 R, 75 A, 90 R, 221, 224; 74/89.38, 89.39

(56) References Cited

U.S. PATENT DOCUMENTS

| | | | | |
|---|---|---|---|---|
| 2,144,135 A | * | 1/1939 | Zindel ....................... | 244/75 R |
| 4,441,675 A | * | 4/1984 | Boehringer et al. ........ | 244/213 |
| 4,603,594 A | * | 8/1986 | Grimm ...................... | 74/89.39 |
| 4,633,984 A | * | 1/1987 | Hudson ..................... | 192/215 |
| 4,745,815 A | * | 5/1988 | Klopfenstein .............. | 74/89.25 |
| 4,786,013 A | | 11/1988 | Pohl | |
| 5,743,490 A | | 4/1998 | Gillingham et al. | |
| 6,224,017 B1 | * | 5/2001 | Fischer et al. ............ | 244/75 R |
| 6,349,798 B1 | | 2/2002 | McKay | |
| 6,659,398 B2 | * | 12/2003 | Serven ..................... | 244/75 R |

OTHER PUBLICATIONS

777 High Lift Systems, 777 Maintenance Manual, Publication Date: Circa 1994 (1 page).
777 Transmission—Typical, 777 Maintenance Manual, Publication Date: Circa 1994 (1 page).
Flap Transmission and Support, 777 Maintenance Manual, Publication Date: Circa 1994 (1 page).
Airfame Structural Design, Chen–Yeun Niu, Conmilit Press, 1988 (1 page).
A340 Flight Controls, SAE Presentation, Publication Date: Circa 1995 (1 page).
A320 Hinterkantern–Klappen–Verstell System, Trailing Edge Trap System, SAE Presentation, Publication Date: Circa 1990 (1 page).
Flap Drive System, 777 Maintenance Manual, Publication Date: Circa 1994 (1 page).

* cited by examiner

Primary Examiner—Galen Barefoot
(74) Attorney, Agent, or Firm—Perkins Coie LLP

(57) ABSTRACT

Systems and methods for holding high lift and drag devices and other aircraft control surfaces in position. In one embodiment, a system for moving a trailing edge flap between a retracted position and an extended position includes a drive shaft operably coupled to the flap. The drive shaft moves the flap from the extended position toward the retracted position by rotating in a first direction about a longitudinal axis. The system further includes a brake configured to resist rotation of the drive shaft in the first direction when the control surface is in the extended position. The brake is further configured to resist rotation of the drive shaft in the first direction as the control surface moves from the extended position toward the retracted position.

35 Claims, 4 Drawing Sheets

BRAKE SYSTEMS FOR AIRCRAFT WING FLAPS AND OTHER CONTROL SURFACES

TECHNICAL FIELD

The following disclosure relates generally to brake systems for holding wing flaps and other aircraft control surfaces in position, and to methods for using such brake systems.

BACKGROUND

All aircraft include movable control surfaces for directional control in flight. Such control surfaces can include ailerons for roll control, elevators for pitch control, and rudders for yaw control. In addition, most conventional jet transport aircraft typically include leading edge slats and trailing edge flaps on the wings.

These devices can be used to generate high lift during takeoff and landing when the aircraft is traveling at relatively low air speeds.

Federal aviation regulations (FARs) impose airworthiness standards on lift and drag devices for transport category aircraft. For example, FAR §25.697 requires that such devices (e.g., trailing edge flaps) must maintain selected positions (e.g., extended positions) without further attention by the pilot. This requirement applies at all times during flight. Thus, lift and drag devices must be able to maintain extended positions even during a general failure of the aircraft's power system. Applicant further understands that future FARs will require periodic testing of lift and drag devices to demonstrate their ability to maintain selected positions under flight loads without power and without pilot input.

Trailing edge flaps ("flaps") on jet transport aircraft typically deploy aft of the wing and downward to increase wing area and camber. The flaps are typically powered by a drive shaft that extends longitudinally inside the wing and is coupled to a central power drive unit. The drive shaft is connected by a system of gears to a series of ball screws distributed along the length of the wing adjacent to the flaps. Rotation of the drive shaft in a first direction causes the ball screws to rotate in a corresponding direction, thereby extending the flaps. Similarly, counter rotation of the drive shaft causes the ball screws to counter-rotate, thereby retracting the flaps.

Conventional brake systems for holding flaps in position include "no-back" brake systems and "wing-tip" brake systems. Both of these systems are "active" brake systems that actively engage the flap deployment system to hold the flaps in a selected position and actively release the flap deployment system for flap repositioning. A typical wingtip brake system, for example, includes a friction brake that engages the drive shaft when the flaps are fully extended to hold the flaps in the extended position. For flap retraction, the wingtip brake releases the drive shaft so the power unit can rotate the drive shaft in the counter direction and retract the flaps.

One shortcoming of conventional flap brake systems is the difficulty in testing the ability of the brake to hold the flaps in a selected position. Another shortcoming of such systems is that they typically do not include means for determining the health of the system. That is, such systems typically do not include means for determining the amount of useful life remaining on the system components before one or more of the components should be replaced or refurbished. As a result, these components are typically replaced as a matter of course well before the end of their useful life.

SUMMARY

Aspects of embodiments of the invention are directed to brake systems for aircraft control surfaces such as leading edge slats and trailing edge flaps. In one embodiment, an aircraft system for moving a control surface between an extended position and a retracted position includes a movable member and a brake. The movable member can be operably coupled to the control surface such that the control surface moves from the extended position toward the retracted position in response to movement of the movable member in a first direction. The brake can be configured to resist movement of the movable member in the first direction when the control surface is in the extended position. The brake can be further configured to resist movement of the movable member in the first direction when the control surface moves from the extended position toward the retracted position. In one aspect of this embodiment, the aircraft system can further include a force sensor operably coupled to the brake that is configured to measure a force applied to the brake as the control surface moves from the extended position toward the retracted position. A memory device can be operatively coupled to the force sensor that is configured to record the force applied to the brake as the control surface moves from the extended position toward the retracted position.

In another embodiment, a method for operating an aircraft control surface can include activating a control system to move the control surface from a retracted position to an extended position. Once in the extended position, a brake can be applied to the control system to at least restrict motion of the control surface from the extended position. The method can further include activating the control system to move the control surface from the extended position to the retracted position. While the control surface is moving from the extended position to the retracted position, the brake can continue to be applied to the control system to resist the movement of the control surface from the extended position to the retracted position.

DETAILED DESCRIPTION

The following disclosure describes brake systems for use with aircraft trailing edge flaps, leading edge slats, and other control surfaces. Certain specific details are set forth in the following description and in FIGS. 1–5 to provide a thorough understanding of various embodiments of the invention. Other details describing well-known structures and systems often associated with aircraft, and more specifically, with aircraft control surface operating systems, are not set forth in the following description to avoid unnecessarily obscuring the description of the various embodiments of the invention.

Many of the details, dimensions, angles, and other specifications shown in the Figures are merely illustrative of particular embodiments of the invention. Accordingly, other embodiments can have other details, dimensions, and specifications without departing from the spirit or scope of the present invention. In addition, other embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
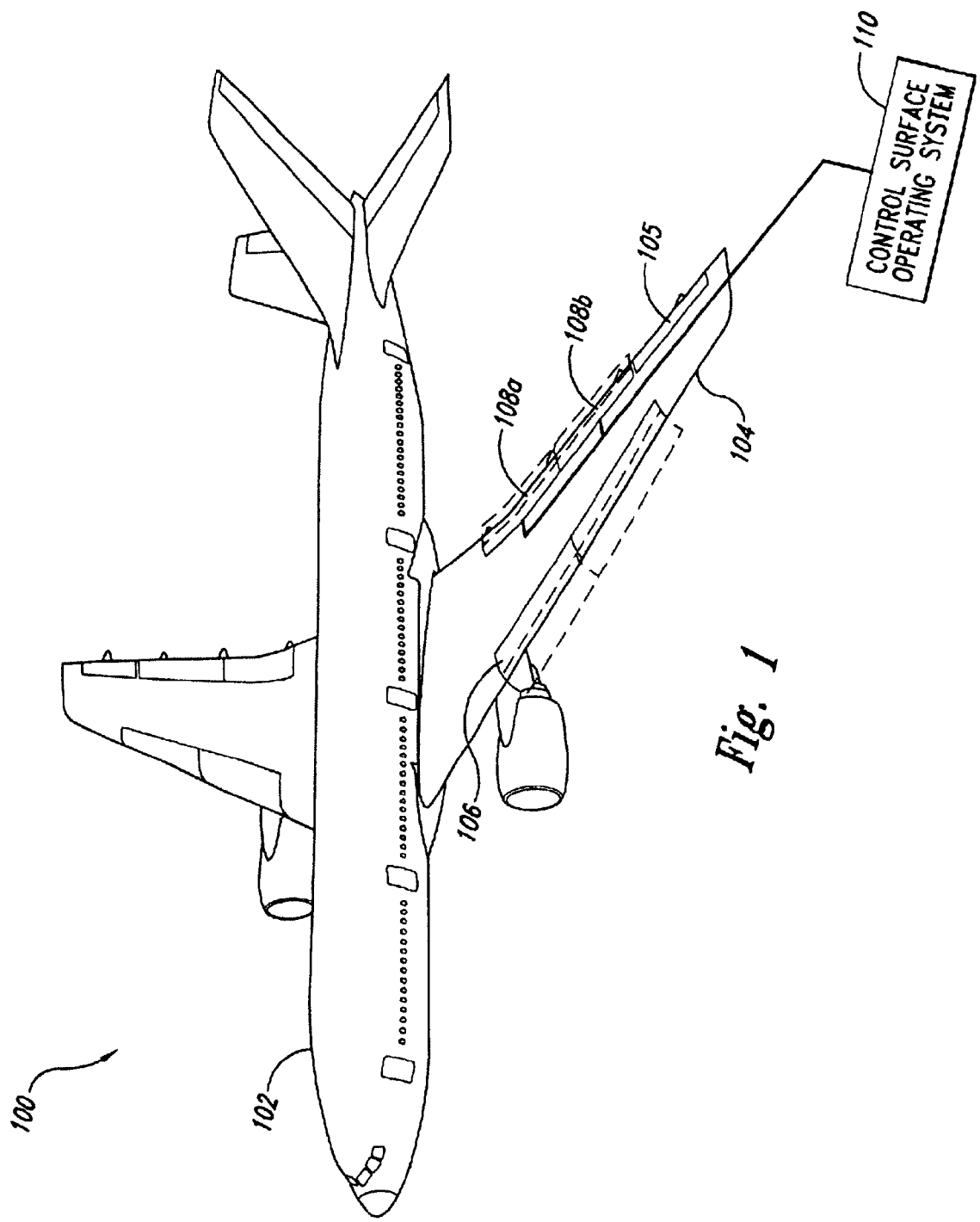
FIG. 1 is a partially schematic top isometric view of an aircraft having a control surface operating system configured in accordance with an embodiment of the invention.

FIG. 1 is a partially schematic top isometric view of an aircraft 100 having a control surface operating system 110 (shown schematically) configured in accordance with an embodiment of the invention. In one aspect of this embodiment, the aircraft 100 includes a fuselage 102 and a wing 104 fixedly attached to the fuselage 102. The wing 104 can include a number of movable control surfaces for controlling the aircraft 100 during flight. These surfaces can include not only ailerons 105 for roll control, but also leading edge slats 106 and trailing edge flaps 108 (shown as an inboard flap 108a and an outboard flap 108b) for generating increased lift during takeoff and landing.

In operation, the control surface operating system 110 can move the flaps 108 between retracted positions (shown by solid lines) and extended positions (shown by dotted lines). In the extended positions, aerodynamic forces tending to move the flaps 108 may be substantial. According to the FARs, however, the control surface operating system 110 should be able to hold the flaps 108 in the extended positions without any input by the pilot of the aircraft 100, and even in the event of a general power failure. As described in greater detail below, the control surface operating system 110 can include a brake configured to hold the flaps 108 in the extended positions against the aerodynamic forces. Although the foregoing discussion refers to the flaps 108 for purposes of illustration, the discussion is equally applicable to the slats 106 because they function in a similar manner and are generally subject to the same functional requirements as are imposed on the flaps 108.

Figure 2:
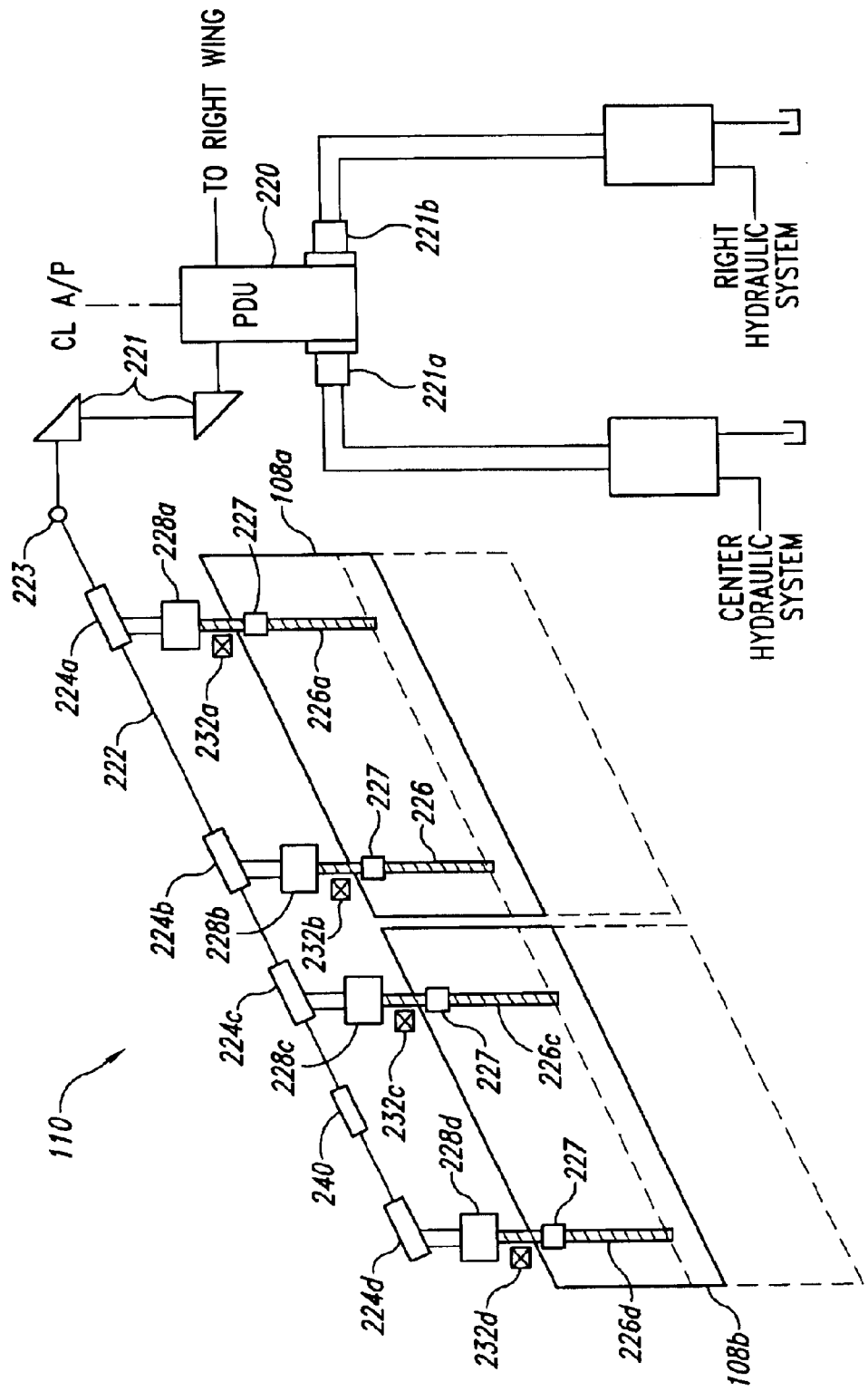
FIG. 2 is a schematic top view of the control surface operating system of FIG. 1 configured in accordance with an embodiment of the invention.

FIG. 2 is a schematic top view of the control surface operating system 110 of FIG. 1 configured in accordance with an embodiment of the invention. In one aspect of this embodiment, the control surface operating system 110 ("system 110") includes a power drive unit 220 ("PDU 220") operably coupled to a drive shaft 222 by a series of gearboxes 221 and a universal joint 223. The PDU 220 can be housed in the fuselage 102 of the aircraft 100 (FIG. 1), and the drive shaft 222 can extend longitudinally within the wing 104 forward of the flaps 108. Redundant hydraulic motors 221a,b provide power to the PDU 220. In other embodiments, the PDU 220 can include other forms of power, such as electrical power.

In another aspect of this embodiment, the drive shaft 222 is operably coupled to a series of "T" gearboxes 224 positioned along the length of the drive shaft 222 (shown as a first T gearbox 224a, a second T gearbox 224b, a third T gearbox 224c, and a fourth T gearbox 224d). The T gearboxes 224 transfer shaft power from the drive shaft 222 to corresponding transmissions 228 (shown as a first transmission 228a, a second transmission 228b, a third transmission 228c, and a fourth transmission 228d). Corresponding ball screws 226 (shown as a first ball screw 226a, a second ball screw 226b, a third ball screw 226c, and a fourth ball screw 226d) extend aft from each of the transmissions 228a–c and operably engage threaded couplings 227 attached to the wing flaps 108.

To extend the flaps 108, the PDU 220 causes the drive shaft 222 to rotate in a first direction about a longitudinal axis 290. This rotation of the drive shaft 222 causes the ball screws 226 to rotate in unison in a corresponding direction, causing the flaps 108 to move aft to extended positions (shown by dotted lines in FIG. 2). In a further aspect of this embodiment, the system 110 can also include position sensors 232 positioned adjacent to each of the ball screws 226. The position sensors 232 are configured to monitor rotation of the adjacent ball screws 226 to ensure that they do not skew the flaps 108 during extension. To retract the flaps 108, the PDU 220 causes the drive shaft 222 to counter-rotate in a second direction opposite to the first direction.

In yet another aspect of this embodiment, the system 110 includes a control surface brake 240 operably coupled to the drive shaft 222 to hold the flaps 108 in extended positions. In one embodiment described in greater detail below, the brake 240 can permit free rotation of the drive shaft 222 in the first direction during flap extension and resist counter rotation of the drive shaft 222 in the second direction during flap retraction. Accordingly, during extension of the flaps 108, the brake 240 exerts little or no resistance against the PDU 220. Once the flaps 108 are in an extended position, the brake 240 holds the flaps (108) in the extended position by resisting rotation of the drive shaft 222 in the retraction direction. For flap retraction, the PDU 220 applies sufficient torque to the drive shaft 222 such that, when combined with the torque from the aerodynamic load on the flaps 108, the drive shaft 222 overcomes the brake 240 and retracts the flaps 108.

In a further aspect of this embodiment, the drive shaft torque required to overcome the brake 240 and retract the flaps 108 can be based at least partially on the maximum expected aerodynamic load on the flaps 108. For example, if the maximum expected aerodynamic load exerts a torque of 400 inch-pounds on the brake 240, then the brake 240 can be sized to require at least about 450 inch-pounds of torque before slipping. Sizing the brake 240 in this manner can ensure that the system 110 has a sufficient margin of safety above and beyond the maximum expected aerodynamic load on the flaps 108. Further, sizing the brake 240 in this manner can also ensure that the PDU 220 only has to apply an additional 50 inch-pounds of torque to the drive shaft 222 to overcome the brake 240 and retract the flaps 108 when they are experiencing the maximum aerodynamic load.

In yet another aspect of this embodiment, the brake 240 is positioned between the third T gearbox 224c and the fourth T gearbox 224d. This feature can reduce the likelihood of the flaps 108 moving from a selected position if the drive shaft 222 breaks. For example, if the brake 240 is instead positioned between the first T gearbox 224a and the second T gearbox 224b, then a break in the drive shaft 222 between the second T gearbox 224b and the third T gearbox 224c would leave the outboard flap 108b without any brake system. By positioning the brake 240 as shown in FIG. 2, however, a single break anywhere in the drive shaft 222 will not leave either flap 108 without a brake system because the brake on the opposite wing (not shown) holds the inboard flap 108a if a drive shaft break occurs outboard of the second T gearbox 224b. The opposite wing brake is able to hold the inboard flap 108a in position because the inboard flap 108a is connected to the opposite wing brake by the PDU 220.

Figure 3:
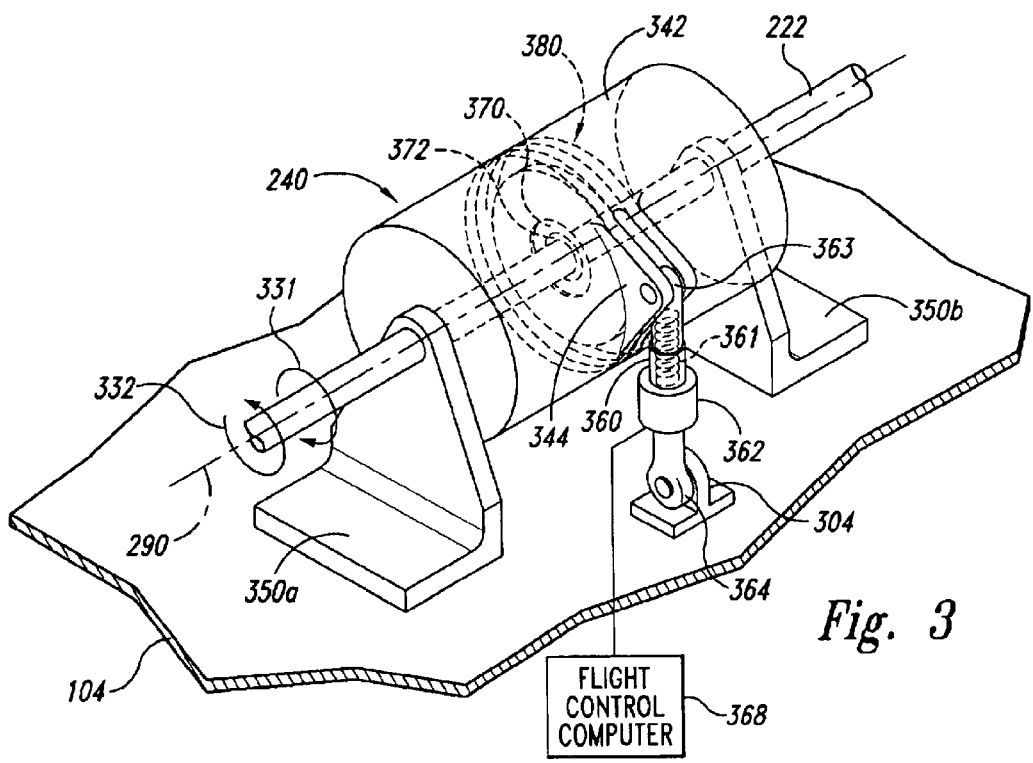
FIG. 3 is a partially schematic, partially hidden isometric view of a control surface brake configured in accordance with an embodiment of the invention.

FIG. 3 is a partially schematic, partially hidden isometric view of the brake 240 of FIG. 2 configured in accordance with an embodiment of the invention. In one aspect of this embodiment, the brake 240 includes a body 342 pivotally mounted between a first support 350a and a second support 350b. The supports 350 can be fixedly attached to the internal structure of the wing 104. A fitting 344 extends outwardly from the body 342 and is coupled to a first end 363 of a link 360. A second end 364 of the link 360 is coupled to a fitting 304 fixedly attached to the internal structure of the wing 104. In this manner, the link 360 prevents any appreciable rotation of the brake body 342 about the longitudinal axis 290.

In another aspect of this embodiment, the drive shaft 222 extends coaxially through the brake body 342 along the longitudinal axis 290. A rotor 370 positioned inside the brake body 342 can be mounted to the drive shaft 222 by a ratchet mechanism 372. A motion resister 380 can be fixedly attached to the inside of the brake body 342 and configured to resist rotation of the rotor 370.

Figure 4:
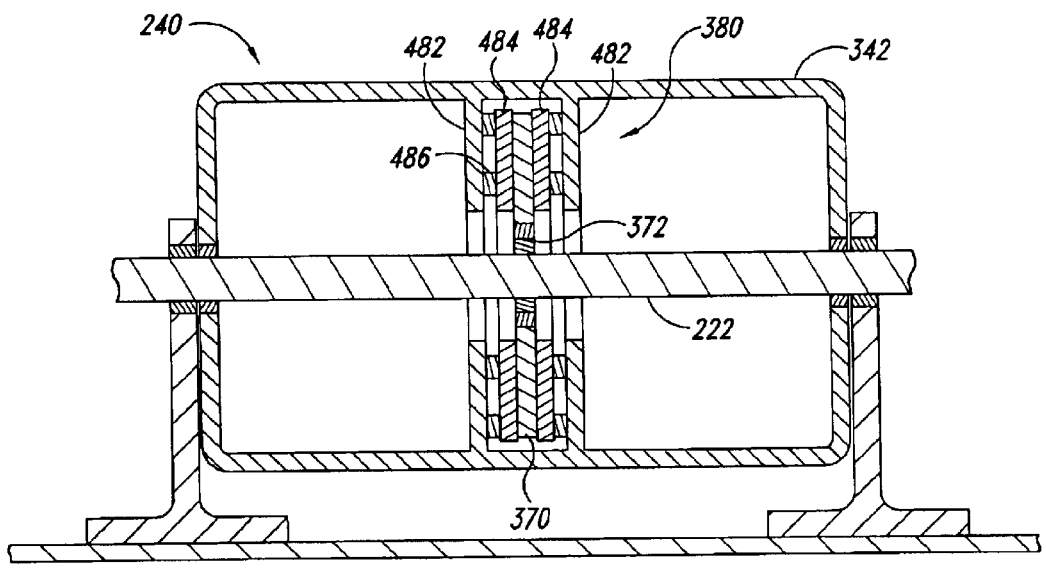
FIG. 4 is a side cross-sectional view of the brake of FIG. 3 configured in accordance with an embodiment of the invention.

FIG. 4 is a side cross-sectional view of the brake 240 of FIG. 3 configured in accordance with an embodiment of the invention. In one aspect of this embodiment, the motion resister 380 includes a caliper portion 482 fixed to the interior of the brake body 342. The caliper portion 482 can support a plurality of compression members 486 that push against opposing friction disks 484. In one embodiment, the compression members 486 can include Belleville washers or other mechanical compression springs. In other embodiments, the compression members 486 can include hydraulic or pneumatic actuators. In another aspect of this embodiment, the rotor 370 is sandwiched between the opposing friction disks 484 such that the friction disks 484 exert a friction force against the rotor 370 if the drive shaft 222 applies a torque to the rotor 370.

Referring to FIGS. 3 and 4 together, in one embodiment, the ratchet mechanism 372 allows the drive shaft 222 to rotate in a first direction 331 relatively independent of the rotor 370. As a result, the PDU 220 (FIG. 2) can apply a torque to the drive shaft 222 in the first direction 331 to extend the flaps 108 without encountering significant resistance from the motion resister 380. When the flaps 108 (FIG. 2) are in an extended position, aerodynamic forces acting on the flaps 108 cause them to exert a torque on the drive shaft 222 in a second direction 332. When this happens, however, the ratchet mechanism 372 causes the drive shaft 222 to engage the rotor 370, and the motion resister 380 exerts a frictional force on the rotor 370 to prevent rotation of the drive shaft 222 in the second direction 332. In this manner, the brake 240 holds the flaps 108 in the extended position without any input from the pilot, even in the event of a power failure.

To retract the flaps 108, the PDU 220 (FIG. 2) applies a torque to the drive shaft 222 in the second direction 332 that is sufficient to overcome the brake 240. Here, "to overcome the brake 240" means that the torque applied to the drive shaft 222 is sufficient to cause the rotor 370 to slip and rotate with respect to the motion resister 380. The motion resister 380 exerts a drag on the rotor 370 that is at least generally constant as the flaps 108 move from an extended position toward the retracted position. In summary, in the illustrated embodiment, the brake 240 does not exert appreciable drag on the drive shaft 222 as the drive shaft 222 rotates in the first direction 331 to move the flaps 108 outward to an extended position, but the brake 240 does exert an at least generally constant drag on the drive shaft 222 as the drive shaft 222 counter-rotates in the second direction 332 to move the flaps 108 inward toward the retracted position.

The configuration of the motion resister 380 described above with reference to FIGS. 3 and 4 is provided here solely for the purpose of illustrating one of the many brake configurations possible in accordance with the present invention. Accordingly, in other embodiments, a control surface brake can include motion resister configurations different than that described above without departing from the spirit or scope of the present invention. For example, in another embodiment, a motion resister can include a series of alternating rotors and friction disks that provide essentially the same function as the motion resister 380 described above. In a further embodiment, a motion resister can include cylindrical friction surfaces instead of the flat friction surfaces depicted in FIG. 4. In yet another embodiment, the friction disks 484 can include friction pads with at least generally flat friction surfaces. In other embodiments, the friction disks 484 can include skewed rollers that bear against the rotor 370 to provide the requisite frictional force. In addition, in one embodiment, the compression members 486 can include Belleville washers or other types of mechanical springs. In other embodiments, the compression members 486 can include hydraulic or pneumatic pressure. Accordingly, the present invention is not limited to the particular embodiment described above with reference to FIGS. 3 and 4.

In other embodiments, the flaps 108 can be extended and retracted by movable members other than the rotating drive shaft 222 described above with reference to FIGS. 3 and 4. For example, in one other embodiment, the flaps 108 can be extended and retracted by a movable member, such as a pushrod or other linkage, that is coupled to the flaps 108 and translates axially, for example, axially fore and aft, to move the flaps 108. In one aspect of this other embodiment, the movable member may be hydraulically or pneumatically actuated to move the flaps 108. In yet another embodiment, the flaps 108 can be extended and retracted by an electrically driven actuator that is coupled to the flaps 108. In these other embodiments, a brake can be configured in accordance with the present disclosure to resist movement of the movable member in the retraction direction when the flap is in the extended position, and further configured to resist movement of the movable member in the retraction direction as the flap moves in the retracted direction.

Returning to FIG. 3, in one aspect of this embodiment, the link 360 can include a spring 361 connected in series with a force sensor 362. The force sensor 362 can be configured to measure the tension force applied to the link 360 when the brake 240 resists rotation of the drive shaft 222. Once this tension force is known, the torque capability of the brake 240 can be easily derived. In one embodiment, the force sensor 362 can include a strain gauge or other piezoelectric device. In other embodiments, the force sensor 362 can include a device for measuring elongation or displacement of the link 360 against the spring 361. The tension load applied to the link 360 can be derived from this displacement. In other embodiments, the force sensor 362 and/or the link 360 can include other devices for measuring the tension force applied to the link 360. Such other devices can include, for example, various proximity switches, microswitches, torque cells, score sensors, and the like.

In another aspect of this embodiment, the force sensor 362 can be operatively connected to a flight control computer 368 (shown schematically in FIG. 3). Rotation of the drive shaft 222 in the second direction 332 exerts a torque on the brake 240 that is reacted by a corresponding tension force in the link 360. The force sensor 362 can measure this tension force and transmit that information to the flight control computer 368.

In one embodiment, the flight control computer 368 can use the tension force measured by the force sensor 362 to determine the health of the brake 240. For example, the flight control computer 368 can periodically compare the maximum torque capability of the brake 240, as measured by the force sensor 362, to the maximum expected torque from the aerodynamic loads on the flaps 108 to ensure that the capability of the brake 240 exceeds the maximum expected torque by an acceptable margin. As the motion resister 380 wears down over time, the brake capability as measured by the force sensor 362 will also decline. When the brake 240 no longer provides a sufficient margin over the maximum expected aerodynamic loads, then the flight control computer 368 can send a signal (for example, to the cockpit for the pilot or to a memory for download by maintenance personnel) indicating that service of the brake 240 is required.

One feature of aspects of the embodiment illustrated in FIGS. 3 and 4 is that the brake 240 is a "passive" brake that is always "on." One advantage of this feature is that the brake 240 will hold the flaps 108 in an extended position even if there is a general failure of the aircraft power system. Another feature is that the force sensor 362 provides health monitoring of the brake 240. For example, by monitoring the torque capability of the brake 240 when the drive shaft 222 is rotating in the second direction 332 to retract the flaps 108, an aircraft operator can ensure that the brake 240 always has the ability to hold the flaps 108 in position under maximum expected aerodynamic loads with a sufficient margin. Further, any degradation in brake performance observed over time can be used to schedule routine maintenance of the brake 240. Yet another advantage of this configuration is that a separate brake testing procedure is not needed because the health of the brake can be monitored in real time during normal operations.

Figure 5:
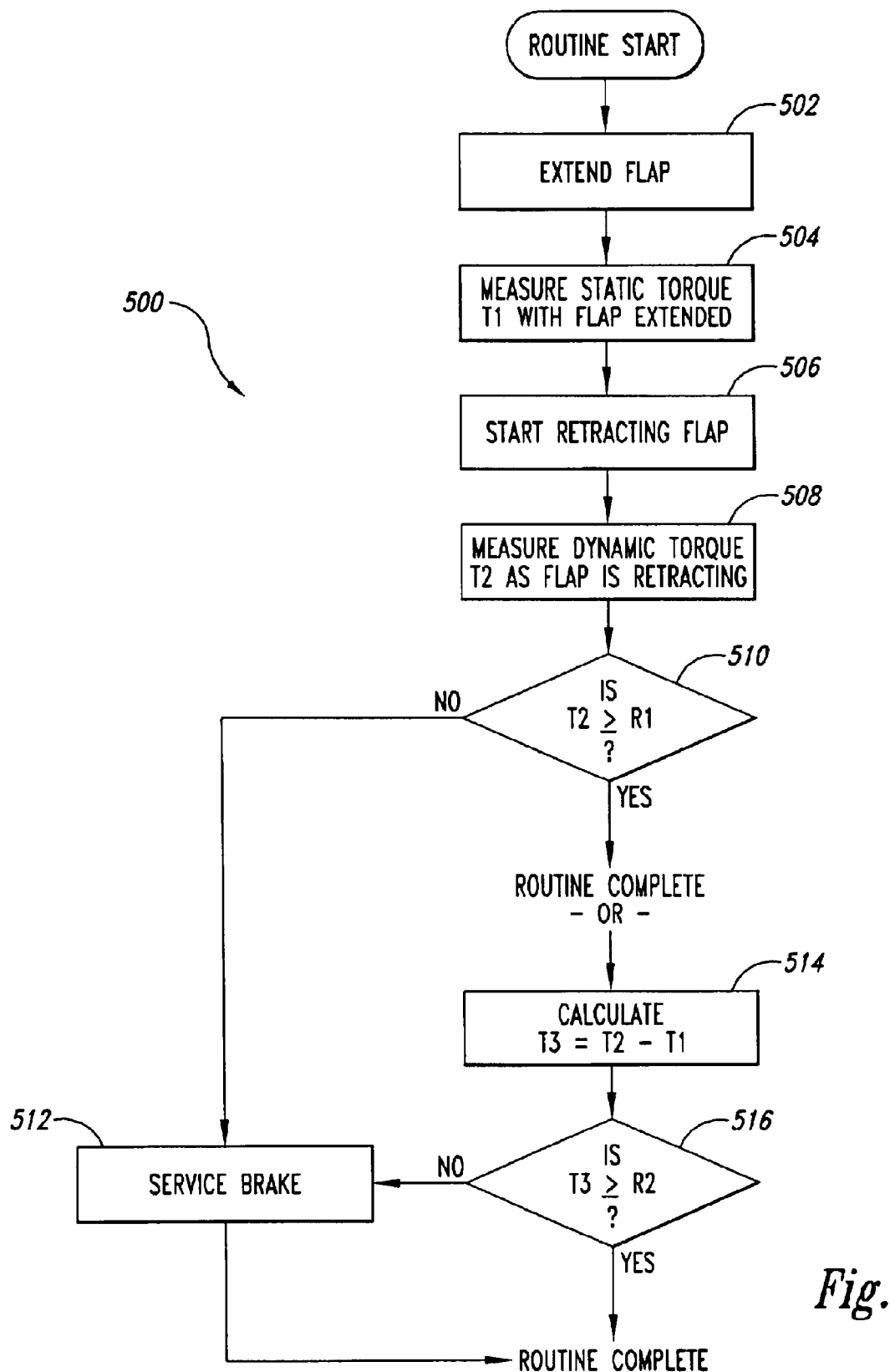
FIG. 5 is a flow diagram of a routine for monitoring the health of a control surface brake in accordance with an embodiment of the invention.

FIG. 5 is a flow diagram of a routine 500 for monitoring the health of a control surface brake, such as a trailing edge flap brake, in accordance with an embodiment of the invention. In block 502, a pilot or other operator commands the flap to move from the retracted position to an extended position. In block 504, a force sensor or other suitable device measures the static torque T1 applied to the brake by the extended flap. In block 506, the operator commands the flap to retract. In block 508, as the flap is retracting, the force sensor measures the dynamic torque T2 applied to the brake by the drive shaft to retract the flap.

In decision block 510, the routine 500 compares the dynamic torque T2 to a first brake requirement R1 to ensure that the dynamic torque T2 is greater than or equal to the first requirement R1. In one embodiment, the first requirement R1 can be equal to the maximum expected torque from aerodynamic forces plus an acceptable margin of safety. For example, if the maximum expected torque from aerodynamic forces is 400 inch-pounds, then R1 can be set equal to 400 inch-pounds plus an acceptable margin of safety, such as 100 inch-pounds, for a total value of 500 inch-pounds. In this example, the brake would have to be capable of withstanding a torque of 500 inch-pounds before allowing rotation of the drive shaft to retract the flaps. If T2 is not greater than or equal to R1, then in block 512 the routine 500 can send a signal indicating that brake service is required. For example, the routine 500 can send a signal for display in the cockpit of the aircraft to notify the pilot of the brake condition. Alternatively, the signal can be downloaded from the flight control computer by maintenance personnel. Returning to decision block 510, if T2 is greater than or equal to R1, then the routine 500 may be complete. Alternatively, the routine 500 can proceed to block 514 for a further health check.

In block 514, the routine 500 calculates a difference in torque T3 equal to the dynamic torque T2 minus the static torque T1. In this embodiment, T3 is equal to the torque increment that must be applied to the drive shaft by the PDU to overcome the brake and retract the flaps. In decision block 516, T3 is compared to a second brake requirement R2 to ensure that T3 is greater than or equal to R2. In one embodiment, the second brake requirement R2 can be set equal to an acceptable margin of safety for the brake, such as 25%. For example, if the maximum expected torque from aerodynamic forces is 400 inch-pounds, then R2 can be set equal to 100 inch-pounds. If T3 is not greater than or equal to R2, then the routine 500 can proceed to block 512 and send a signal indicating that brake service is required. Alternatively, if T3 is greater than or equal to R2, then the routine 500 is complete.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. An aircraft system for moving a control surface between an extended position and a retracted position, the aircraft system comprising:
    a drive shaft operably coupled to the control surface, wherein the control surface moves from the extended position toward the retracted position in response to rotation of the drive shaft about a longitudinal axis in a first direction;
    a rotor operably coupled to the drive shaft and configured to rotate in response to rotation of the drive shaft in the first direction;
    at least one motion resistor operably engaging the rotor, wherein the rotor rotates with respect to the motion resistor when the drive shaft rotates in the first direction moving the control surface from the extended position toward the retracted position, and wherein the motion resistor resists rotation of the rotor as the rotor rotates with respect to the motion resistor; and
    a sensor operably coupled to the motion resistor and configured to measure a force usable for determining the torque applied to the motion resistor as the rotor rotates with respect to the motion resistor and the control surface moves from the extended position toward the retracted position.

2. The aircraft system of claim 1 wherein the motion resistor is configured to prevent rotation of the drive shaft in the first direction until a torque applied to the drive shaft is sufficient to overcome the motion resistor.

3. The aircraft system of claim 1 wherein the motion resistor is configured to prevent rotation of the drive shaft in the first direction until a torque applied to the drive shaft is sufficient to overcome the motion resistor, and wherein the motion resistor is further configured to apply a resisting torque to the drive shaft that is at least approximately constant as the drive shaft rotates in the first direction moving the control surface from the extended position toward the retracted position.

4. The aircraft system of claim 1 wherein the control surface moves from the retracted position toward the extended position in response to rotation of the drive shaft about the longitudinal axis in a second direction opposite to the first direction.

5. The aircraft system of claim 1 wherein the rotor includes a first friction surface that is at least generally flat and the motion resistor includes a second friction surface that is at least generally flat, wherein the second friction surface operably engages the first friction surface when the rotor rotates with respect to the motion resistor and the drive shaft rotates in the first direction to move the control surface from the extended position toward the retracted position.

6. The aircraft system of claim 1 wherein the rotor includes a first friction surface that is at least generally cylindrical and the motion resistor includes a second friction surface that is at least generally cylindrical, wherein the second friction surface operably engages the first friction surface when the rotor rotates with respect to the motion resistor and the drive shaft rotates in the first direction to move the control surface from the extended position toward the retracted position.

7. The aircraft system of claim 1, wherein the control surface moves from the retracted position toward the extended position in response to rotation of the drive shaft about the longitudinal axis in a second direction opposite to the first direction, and wherein the motion resistor resists rotation of the rotor when the drive shaft rotates in the second direction.

8. The aircraft system of claim 1 wherein the control surface moves from the retracted position toward the extended position in response to rotation of the drive shaft about the longitudinal axis in a second direction opposite to the first direction, and further wherein the rotor is operably coupled to the drive shaft by a ratchet, the ratchet causing the rotor to rotate as the drive shaft rotates in the first direction, the ratchet allowing the rotor to remain stationary as the drive shaft rotates in the second direction.

9. The aircraft system of claim 1, further comprising:
a memory device operatively connected to the sensor and configured to record the torque applied to the motion resistor as the control surface moves from the extended position toward the retracted position.

10. The aircraft system of claim 1 wherein the sensor is a force sensor.

11. The aircraft system of claim 1 wherein the control surface is a trailing edge flap and the drive shaft is operably connected to the trailing edge flap.

12. The aircraft system of claim 1 wherein the control surface is a leading edge slat and the drive shaft is operably connected to the leading edge slat.

13. The aircraft system of claim 1, further comprising the control surface.

14. The aircraft system of claim 1, further comprising:
the control surface;
a wing supporting the control surface; and
a fuselage fixedly attached to the wing.

15. An aircraft control system comprising:
a drive shaft;
a power drive unit operably coupled to the drive shaft and configured to rotate the drive shaft about a longitudinal axis in a first direction and a second direction;
a rotor operably coupled to the drive shaft and configured to rotate in response to rotation of the drive shaft in at least the first direction;
a movable control surface operably coupled to the drive shaft, wherein rotation of the drive shaft in the first direction moves the control surface from an extended position toward a retracted position;
a brake including at least one motion resistor configured to operably engage the rotor and resist rotation of the rotor, wherein the rotor rotates with respect to the motion resistor when the drive shaft rotates in the first direction moving the control surface from the extended position toward the retracted position; and
a sensor operably coupled to the brake and configured to measure a force usable for determining the torque applied to the brake as the rotor rotates with respect to the motion resistor and the control surface moves from the extended position toward the retracted position.

16. The control system of claim 15 wherein the brake further includes a body and a fitting, wherein the fitting is operably connected to the body and configured to at least generally prevent rotation of the body, and wherein the sensor is operably coupled to the fitting and configured to measure a force applied to the fitting as the rotor rotates with respect to the motion resistor, the force being usable to determine the torque applied to the brake as the control surface moves from the extended position toward the retracted position.

17. The aircraft system of claim 15 wherein the rotor includes a first friction surface that is at least generally flat and the motion resistor includes a second friction surface that is at least generally flat, wherein the second friction surface operably engages the first friction surface when the rotor rotates with respect to the motion resistor and the drive shaft rotates in the first direction to move the control surface from the extended position toward the retracted position.

18. The control system of claim 15 wherein the power drive unit includes a hydraulic motor.

19. An aircraft system for moving a control surface between an extended position and a retracted position, the aircraft system comprising:
a movable member operably coupled to the control surface, wherein the control surface moves from the extended position toward the retracted position in response to translation of the movable member in a first direction;
a brake configured to resist translation of the movable member in the first direction when the control surface is in the extended position, and wherein the brake is further configured to resist translation of the movable member in the first direction as the control surface moves from the extended position toward the retracted position; and
a sensor operably coupled to the brake and configured to measure a force applied to the brake as the control surface moves from the extended position toward the retracted position.

20. The aircraft system of claim 19 wherein the brake is configured to resist translation of the movable member in the first direction by applying a frictional force to a friction surface operably coupled to the movable member.

21. The aircraft system of claim 19, further comprising:
a memory device operatively connected to the force sensor and configured to record the force applied to the brake as the control surface moves from the extended position toward the retracted position.

22. The aircraft system of claim 19, further comprising:
the control surface;
a wing supporting the control surface; and
a fuselage fixedly attached to the wing.

23. A method for testing a control system brake on an aircraft, the method comprising:
- activating a control system in a first mode to move a control surface from a retracted position to an extended position;
- applying the control system brake to the control system to at least generally hold the control surface in the extended position;
- activating the control system in a second mode to move the control surface from the extended position to the retracted position;
- while the control surface is moving from the extended position to the retracted position, continuing to apply the brake to the control system to resist the movement of the control surface from the extended position to the retracted position; and
- measuring a load applied to the brake as the control surface moves from the extended position to the retracted position.

24. The method of claim 23 wherein applying a brake to the control system to at least restrict motion of the control surface away from the extended position includes holding the control surface in the extended position.

25. The method of claim 23 wherein applying a brake to the control system to at least restrict motion of the control surface away from the extended position includes resisting rotation of a rotor operably coupled to the control surface.

26. The method of claim 23 wherein activating a control system to move the control surface from a retracted position to an extended position includes applying a first torque to a drive shaft operably coupled to the control surface, and wherein activating the control system to move the control surface from the extended position to the retracted position includes applying a second torque to the drive shaft, the second torque being greater than the first torque.

27. The method of claim 23 wherein the control system brake is configured to withstand a predetermined load prior to permitting the control surface to move from the extended position to the retracted position, and wherein the method further comprises comparing the measured load to the predetermined load to determine a status of the control system brake.

28. The method of claim 23 wherein the control system brake is configured to withstand a predetermined load prior to permitting the control surface to move from the extended position to the retracted position, and wherein the method further comprises comparing the measured load to the predetermined load to determine the remaining useful life of the control system brake.

29. The method of claim 23 wherein the control system brake is configured to withstand a predetermined load prior to permitting the control surface to move from the extended position to the retracted position, and wherein the method further comprises comparing the measured load to the predetermined load to determine a service schedule for the control system brake.

30. The method of claim 23 wherein measuring the load applied to the brake as the control surface moves from the extended position to the retracted position includes measuring a first load, and wherein the method further comprises:
- measuring a second load on the control system when the control system is in the extended position; and
- comparing the first load to the second load to determine a status of the control system brake.

31. The method of claim 23, further comprising flying the aircraft, wherein activating the control system to move the control surface from the extended position to the retracted position includes moving the control surface from the extended position to the retracted position while the aircraft is flying.

32. The method of claim 23 wherein activating a control system in a first mode includes rotating a drive shaft about a longitudinal axis in a first direction, and wherein activating the control system in a second mode includes rotating the drive shaft about the longitudinal axis in second direction opposite to the first direction.

33. An aircraft system comprising:
- retraction means for moving a control surface from an extended position toward a retracted position;
- motion resistor means for resisting movement of the retraction means as the retraction means moves the control surface from the extended position toward the retracted position; and
- sensor means for measuring a force applied to the motion resistor means as the motion resistor means resists movement of the retraction means.

34. The aircraft system of claim 33 wherein the sensor means include means for measuring a torque.

35. The aircraft system of claim 33, further comprising means for assessing the health of the motion resistor means based on a signal from the sensor means.

* * * * *